(12) United States Patent
Shatdal et al.

(10) Patent No.: US 7,236,971 B1
(45) Date of Patent: Jun. 26, 2007

(54) METHOD AND SYSTEM FOR DERIVING DATA THROUGH INTERPOLATION IN A DATABASE SYSTEM

(75) Inventors: Ambuj Shatdal, Madison, WI (US); Michael W. Watzke, Madison, WI (US)

(73) Assignee: NCR Corporation, Dayton, OH (US)

( * ) Notice: Subject to any disclaimer, the term of this patent is extended or adjusted under 35 U.S.C. 154(b) by 450 days.

(21) Appl. No.: 10/325,141

(22) Filed: Dec. 20, 2002

(51) Int. Cl.
*G06F 17/30* (2006.01)
*G06F 15/16* (2006.01)

(52) U.S. Cl. .................. 707/3; 707/2; 707/3; 707/100; 709/223

(58) Field of Classification Search .................... 707/2, 707/3, 100
See application file for complete search history.

(56) References Cited

U.S. PATENT DOCUMENTS

| | | | | |
|---|---|---|---|---|
| 5,640,584 | A | 6/1997 | Kandasamy et al. | 712/30 |
| 5,864,842 | A | 1/1999 | Pederson et al. | 707/3 |
| 5,872,904 | A | 2/1999 | McMillen et al. | 714/4 |
| 5,884,299 | A | 3/1999 | Ramesh et al. | 707/2 |
| 6,477,534 | B1 * | 11/2002 | Acharya et al. | 707/100 |
| 6,801,903 | B2 * | 10/2004 | Brown et al. | 707/2 |
| 6,816,551 | B1 * | 11/2004 | Kasutani | 375/240.08 |
| 2003/0093408 | A1 * | 5/2003 | Brown et al. | 707/2 |
| 2004/0117360 | A1 * | 6/2004 | Preist et al. | 707/3 |
| 2005/0253849 | A1 * | 11/2005 | Reddy et al. | 345/473 |

OTHER PUBLICATIONS

Leonore Neugebauer, "Optimization and Evaluation of Database Queries Including Embedded Interpolation Procedures," pp. 118-127 (1991).
Christian S. Jensen et al., "The Consensus Glossary of Temporal Database Concepts-Feb. 1998 Version," pp. 367-405 (1998).
Stephane Grumbach et al., "Manipulating Interpolated Data is Easier than You Thought,", pp. 156-165 (2000).

* cited by examiner

*Primary Examiner*—Jeffrey Gaffin
*Assistant Examiner*—Hassan "Tony" Mahmoudi
(74) *Attorney, Agent, or Firm*—Trop, Pruner & Hu PC; Adam Bennett

(57) ABSTRACT

A database system is capable of performing interpolation (e.g., temporal interpolation) of data in response to receiving a database query. In one implementation, the database query contains an interpolation function. The database system in one example configuration is a parallel database system that has plural processing units that are capable of performing interpolation of data in parallel.

19 Claims, 5 Drawing Sheets

METHOD AND SYSTEM FOR DERIVING DATA THROUGH INTERPOLATION IN A DATABASE SYSTEM

BACKGROUND

A database is a collection of stored data that is logically related. A popular type of database is provided by the relational database management system (RDBMS), which includes relational tables made up of rows and columns. Data stored in the relational tables are accessed or updated using database queries submitted to the database system.

Evolving database technology has enabled the storage of vast amounts of data. Data warehousing is one database application in which a large amount of data may need to be stored in a database system. For example, a business may desire to store historical data pertaining to business activities, such as sales receipts, orders, inventory levels, customer names, purchasing habits, and so forth. As time goes on, the amount of accumulated data can become quite large. Adding physical resources (in terms of additional storage capacity and processing capacity) to a database system is rather expensive.

One solution that has been proposed for reducing the amount of actual data that has to be physically maintained in a database system is the use of interpolation as a technique for compressing data. One interpolation technique is the temporal interpolation technique, in which data at some sampled time intervals are stored, with temporal interpolation used to obtain or estimate data between the time intervals. However, conventional interpolation techniques in database systems suffer from various shortcomings that reduce user convenience and/or database system performance.

SUMMARY

In general, an improved interpolation mechanism is provided in a database system. For example, a method for use in a database system includes providing an interpolation function to perform interpolation of data, and receiving a database query containing the interpolation function. The interpolation function is executed in performing tasks specified by the database query.

In another example, interpolation can be performed in a parallel database system, such as a parallel database system including a plurality of storage modules and a plurality of processing units to manage parallel access of data in respective storage modules. A parsing controller receives a query that specifies performance of interpolation of data, with the parsing controller sending commands relating to the performance of the interpolation of data to the processing units.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
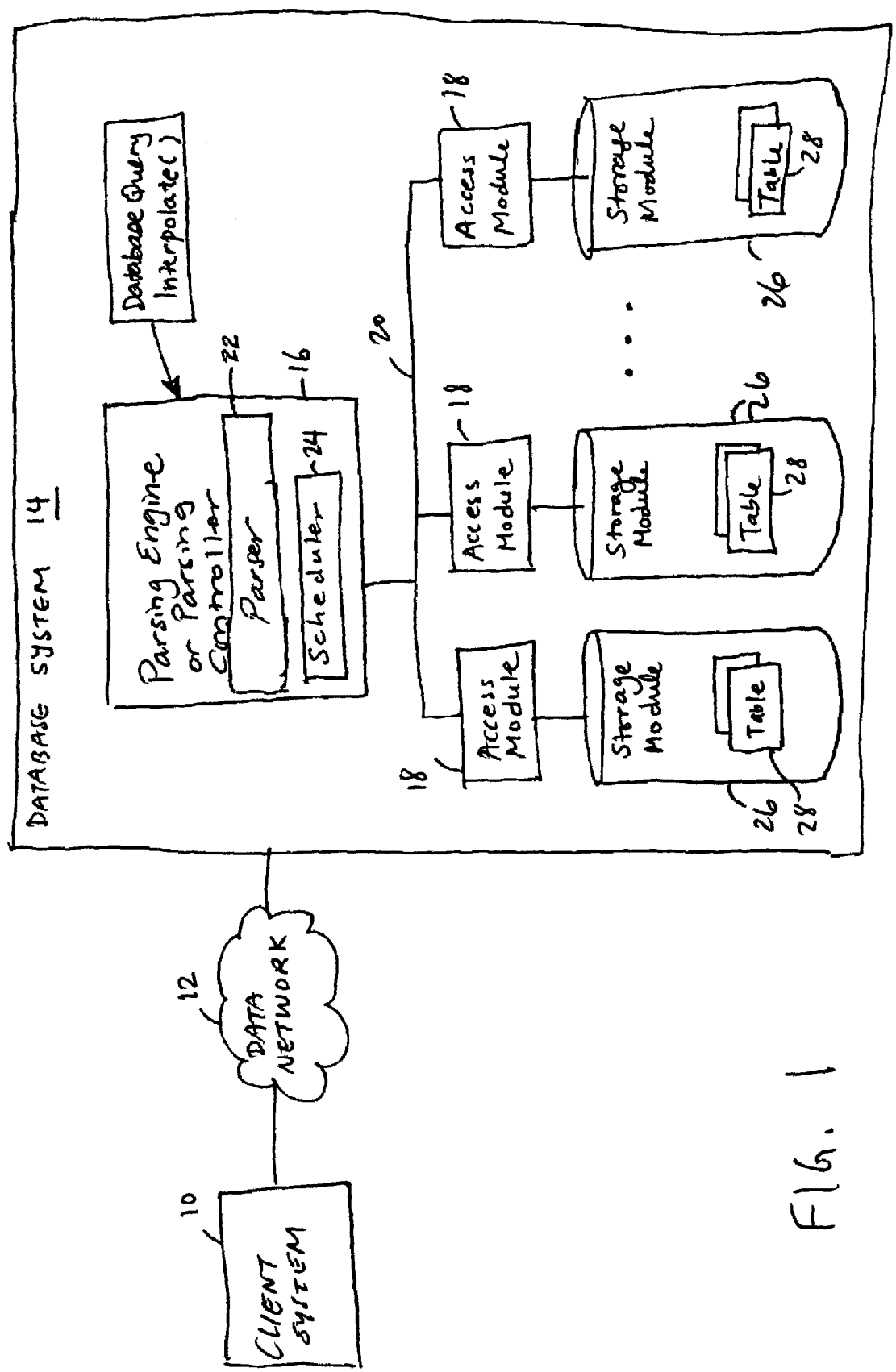
FIG. 1 is a block diagram of an example arrangement including a database system.

FIG. 1 shows an example arrangement in which a client system 10 (or multiple client systems) is coupled to a database system 14 over a data network 12. Examples of the data network 12 include a local area network (LAN), a wide area network (WAN), the Internet, and so forth. The client system 10 is capable of issuing queries according to a standard database query language to the database system 14 to access (retrieve or update data) or to create or alter data structures (e.g., tables, rows, and so forth). One example of a standard database query language is the Structured Query Language (SQL). SQL is provided by the American National Standards Institute (ANSI), with one version being the SQL-99 Standard or SQL:1999 Standard. Although reference is made to SQL-99 in this discussion, other embodiments can employ other types of standard database query languages.

In the example arrangement of FIG. 1, the database system 14 is a parallel database system having a parsing engine 16 (or multiple parsing engines). The parsing engine 16 can also be referred to as a parsing controller (which is implemented as software or hardware, or both). The parsing engine 16 is connected to a plurality of access modules 18 over an interconnect layer 20.

The parsing engine 16 includes a parser 22 and a scheduler 24. The parser is responsible for interpreting a query, checking the query for proper SQL syntax, and generating executable actions. The executable actions are sent by the scheduler 24 to the access modules 18 to perform the requested action or actions. In the parallel database system of 14, database tasks can be performed in parallel by the access modules 18. Each access module 18 is coupled to a respective storage module 26, so that each access module 18 is able to concurrently access data in its respective storage module 16. In one example implementation, the access modules 18 are based on access modules processors (AMPs) of some TERADATA® database systems from NCR Corporation. More generally, an access module is one example of a "processing unit" that is responsible for managing access (retrieval and update) of data stored in a storage module.

In accordance with some embodiments, the parsing engine 16 is capable of parsing a database query that contains an INTERPOLATE( ) function for performing temporal interpolation of data. The INTERPOLATE( ) function is a predefined function that can be specified in a data manipulation language (DML) query, such as a SELECT statement. By providing the INTERPOLATE( ) function, a user can conveniently insert the INTERPOLATE( ) function into a database query for performing the interpolation of data in one or more columns of a table, such as tables 28 stored in storage modules 26.

Another feature of some embodiments of the invention is the ability to perform interpolation of data in a parallel environment, such as in the example parallel database system 14 shown in FIG. 1. To enhance efficiency in the performance of data interpolation in the parallel database system 14, load balancing is performed in which data in a table is partitioned or redistributed across the multiple access modules 18 so that the distribution of workload is balanced as much as possible across the multiple access modules 18. However, in other implementations, the interpolation mechanism can be provided in a non-parallel database system (e.g., a database system with one processing unit).

In accordance with one embodiment of the invention, the INTERPOLATE( ) function is associated with the following arguments: a VALUE COLUMN parameter, which specifies the column of a table on which interpolation is to be performed; and an INTERPOLATION METHOD parameter, to indicate a type of interpolation to be performed (e.g., linear, start-level, or end-level). Linear interpolation refers to calculating a value on a linear curve between a starting point and an ending point that approximates the value at a given point in time. The start-level interpolation technique refers to the use of the value at the starting point of a given interval as the interpolated value. The end-level interpolation technique refers to the use of the value at the ending point of a given interval as the interpolated value. The above provides some examples of interpolation techniques. Note that other embodiments can employ other types of interpolation techniques.

In addition to the INTERPOLATE( ) function, a new clause, referred to as the PERIOD clause, is also defined. Effectively, the PERIOD clause defines a time duration over which interpolation is to be performed. For example, the PERIOD clause may specify a time duration of two years, which will cause the database system to return interpolated values for the two-year duration. The PERIOD clause includes the following fields: PERIOD COLUMN, which specifies the table column on which the interpolation duration is to be defined; a PERIODICITY parameter, which defines the periodicity for the interpolated values; a START_PERIOD parameter, which indicates the start of the interpolation duration; and the END_PERIOD parameter, which indicates the end of the interpolation duration.

An example is provided in the context of a table (referred to as INVENTORY) created as follows:
CREATE TABLE INVENTORY (
ITEM INTEGER
,STORE INTEGER
,DATE DATE
,UNITS INTEGER
)

The INVENTORY table has the following columns: ITEM, STORE, DATE, and UNITS.

An example SELECT statement that uses the INTERPOLATE( ) function is as follows:
SELECT STORE, ITEM, DATE, INTERPOLATE
(UNITS,
START_LEVEL)
FROM INVENTORY
GROUP BY STORE, ITEM
PERIOD DATE BY 1 FROM Jan. 1, 2000 TO Mar. 1, 2002;

In the statement above, the INTERPOLATE( ) function specifies that interpolation is to be performed on the UNITS column of the INVENTORY table. The interpolation technique to be used is the start-level technique. In the PERIOD clause, the PERIOD COLUMN field is the DATE column of the INVENTORY table. The periodicity is 1, which indicates that interpolation is to be performed on each day of the duration defined between START_PERIOD (DATE=Jan. 1, 2000) and the END_PERIOD (DATE=Mar. 1, 2002). The result of the SELECT statement is that the inventory units for each (STORE, ITEM) group for each date in the specified duration (that is, every day in the specified duration between Jan. 1, 2000 and Mar. 1, 2002) will be output.

In another implementation, instead of using a separate PERIOD clause, the information specified in the PERIOD clause can be provided as arguments in the call of the INTERPOLATE( ) function.

Figure 2A:
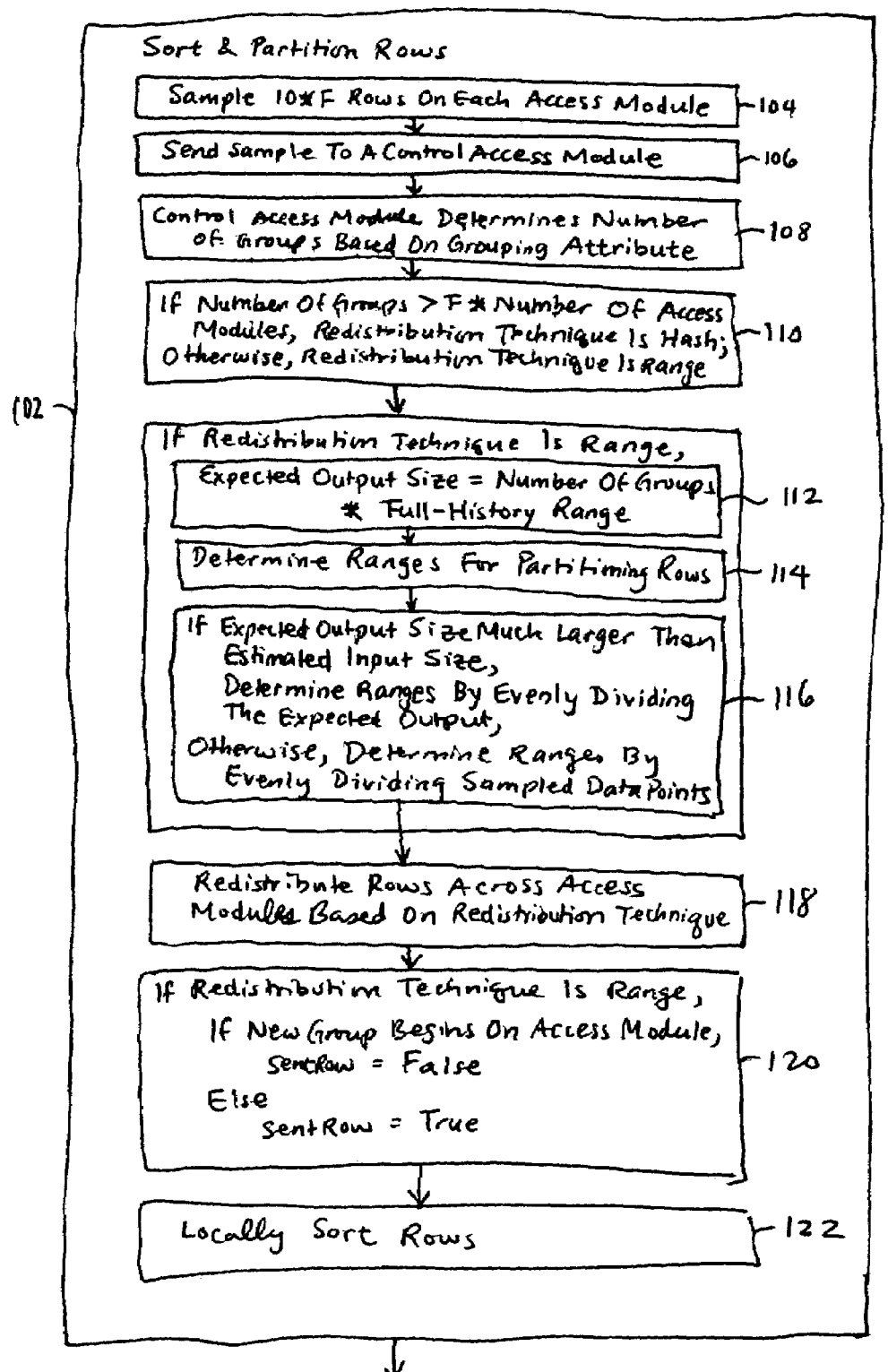
FIGS. 2A-2B are a flow diagram of a process according to one embodiment of the invention of performing temporal interpolation in a parallel database system.
Figure 2B:
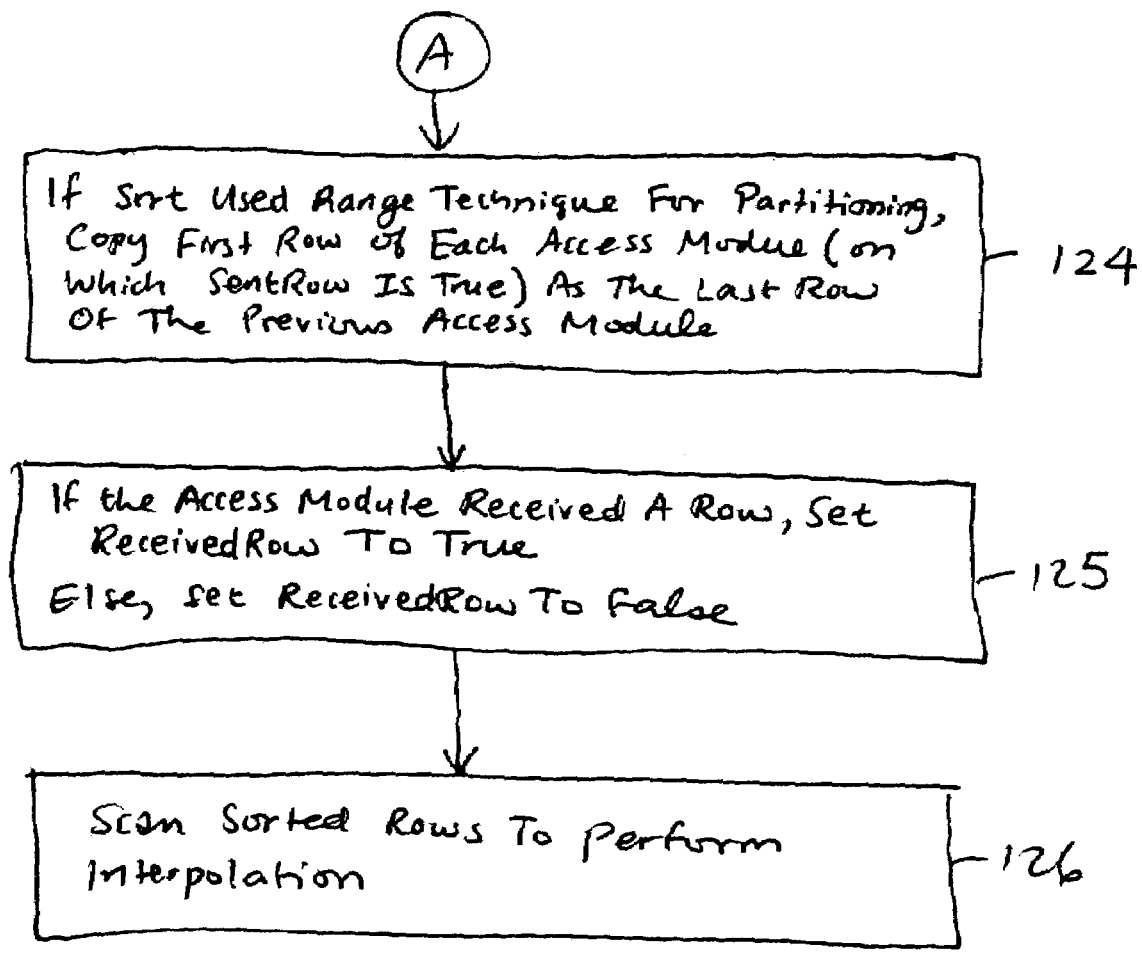

As noted above, the interpolation can be performed in a parallel environment, such as in the parallel database system 14 in FIG. 1. FIGS. 2A-2B illustrate a process for performing interpolation in a parallel environment, according to one embodiment of the invention. The database system 14 sorts and partitions (at 102) the rows of a given table across the multiple access modules 18 of the database system 14. The sorting and partitioning (at 102) includes 104, 106, 108, 110, 112, 114, 116, 118, 120, and 122. In sorting and partitioning the rows of a given table, a tunable parameter F is assigned a value. The parameter F is selected to achieve a compromise between equalizing as much as possible the load across the multiple access modules 18 of the parallel database system 14 and reducing sampling overhead. Increasing the value of F means that a larger number of rows of a given table must be sampled in performing the sorting and partitioning, which means increased sampling overhead. However, increasing F also means that it is more likely to more equally balance the workload among the access modules 18. Thus, the value of F must be carefully selected to ensure optimal performance of the database system without sacrificing accuracy.

In one example implementation, each access module 18 samples (at 104) N*F rows of a given table, where N is a preselected constant value. For example, N can be selected to have a value of 10 or greater. The sample from each access module 18 is sent (at 106) to one randomly selected access module. In other words, all access modules of the database system 14 send their respective samples to one randomly selected access module 18 (referred to herein as the "control access module").

The control access module 18 determines (at 108) from the collective sample (the collection of samples from the multiple access modules 18) the number of groups defined by the grouping column values (the columns of the GROUP BY clause). In the example SELECT statement above, the GROUP BY clause contains the STORE and ITEM columns.

The control access modules then determines (at 110) the redistribution technique to use. If the number of groups determined at 108 is greater than F multiplied by the number of access modules 18, then the redistribution technique used is based on a hash code technique. Each access module is associated with a range of unique hash code values. A column (or multiple columns) of a row, referred to as a primary index, is applied through a hashing algorithm to obtain the hash code for the row. This hash code defines which access module the row is to be associated with. Thus, if the number of groups is larger than F multiplied by the number of access modules, then the hash code is adequate to ensure balancing of the workload.

However, if the number of groups is not greater than F multiplied by the number of access modules, then the redistribution technique used is the range redistribution technique. This means that there are a small number of groups such that partitioning based on hash code would likely result on less than all the access modules performing the interpolation. For example, if there are a hundred access modules, and only 10 groups, then using the hash code redistribution technique would mean that only 10 of the access modules are used to perform interpolation, while the remaining 90 access modules are not used.

If the redistribution technique is the range redistribution technique, then acts 112, 114, and 116 are performed. At 112, the control access module determines the expected output size, which is set equal to the number of groups multiplied by the full-history range, which is the duration defined in the PERIOD clause of the SELECT statement (e.g., Jan. 1, 2000 to Mar. 1, 2002 in the example given above). The control access module considers (at 114) the expected output size, the estimated input size, and the sampled data points to determine the ranges for partitioning the rows so that the work is as evenly divided as possible using the guideline of 116. If the expected output size is much larger (the level of "much" larger can be set by the database operator to be any preselected threshold) than the estimated input size, then the ranges are determined by evenly dividing the expected output among the multiple access modules 18. In this case, the major cost is in generating the output rows so the output rows are partitioned as evenly as possible. However, if the expected output size is not much larger than the estimated input size, then the ranges are determined by evenly dividing the sample data points. In this latter case, the major cost is partitioning the input rows so the input rows are distributed as evenly as possible.

Next, the control access module redistributes (at 118) the rows of the table involved in the query across the multiple access modules 18, with the destination determined by the chosen redistribution technique (either the hash code technique or the range technique). The rows being redistributed are the actual rows of the table, not just the sampled rows.

If the redistribution technique is the range redistribution technique, then a flag SentRow is set to either the true state or the false state depending on certain conditions. If a new group begins on this access module, then the SentRow is set to the false state. However, if the first row belongs to the same group as the last row of the proceeding access module 18, then the SentRow flag is set to true. This flag SentRow is used to indicate whether a row from one access module is to be copied to the a prior access module. To perform interpolation, the starting and ending values of a given interval must be known. The SentRow flag is used to copy rows to each access module, if necessary, so that each access module has the necessary start and end points so that the access module can independently perform interpolation (without having to access another access module to retrieve a data value of a start point or end point of an interval).

Each access module then locally sorts (at 122) the rows stored in the corresponding storage module. The sorting causes the groups to be sorted by time. Each row is associated with a PERIOD attribute, which specifies a time associated with the row.

Next, if the redistribution technique used is the range redistribution technique, the access module copies (at 124) the first row of each access module, for each access module on which SentRow is true, as the last row on the preceding access module. For example, if SentRow is true on access modules M, then the first row of access module M is copied to access module M−1 as the last row of access module M−1. This is performed to enable access module M—1 to have both a start and end points of an interval in which interpolation is to be performed.

If an access module received a row from the next access module, then a parameter ReceivedRow is set (at 125) to a true state. In the above example, access module M−1 sets its ReceivedRow parameter to the true state.

Figure 3A:
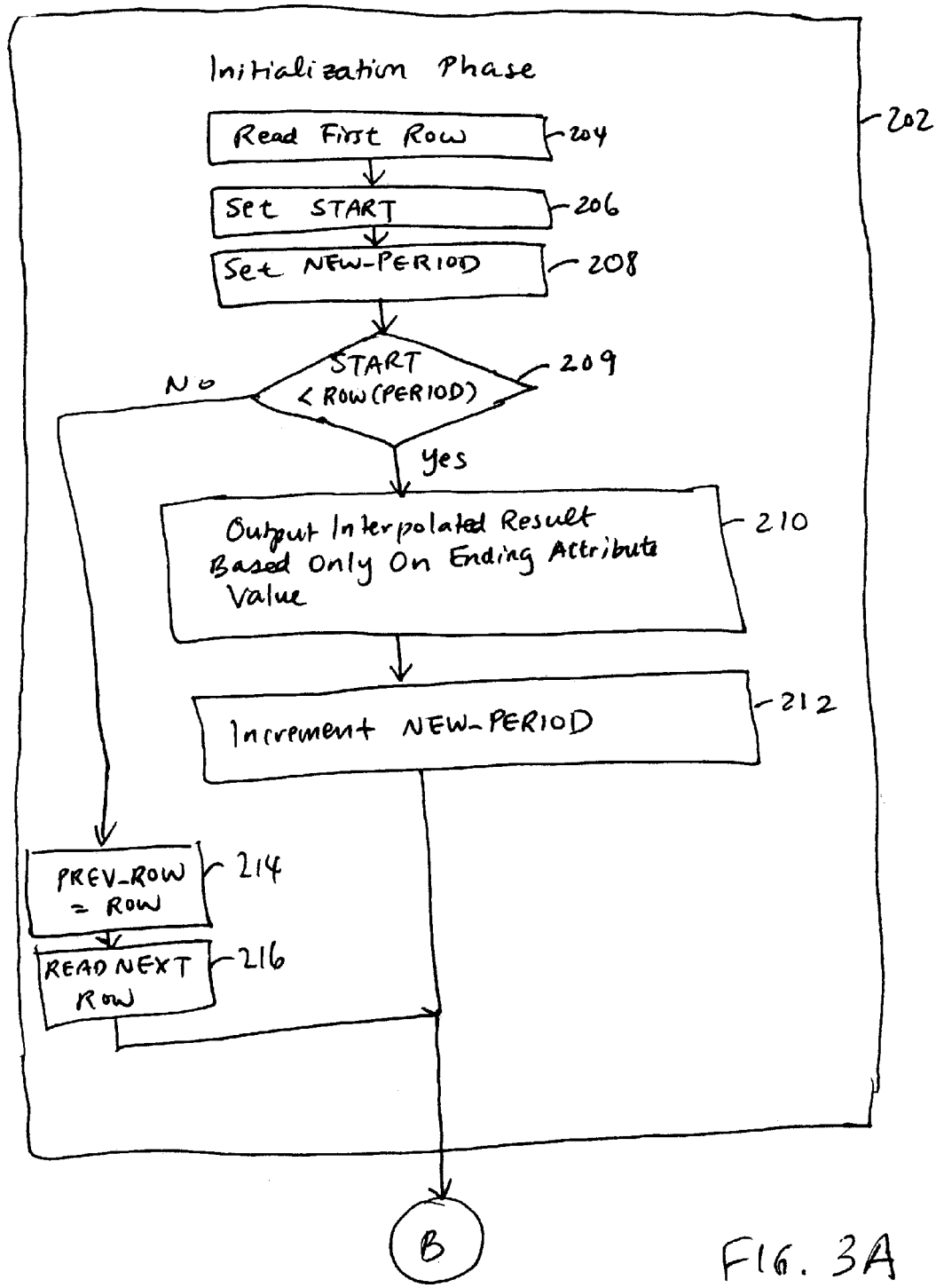
FIGS. 3A-3B are a flow diagram of a process of calculating interpolated results.
Figure 3B:
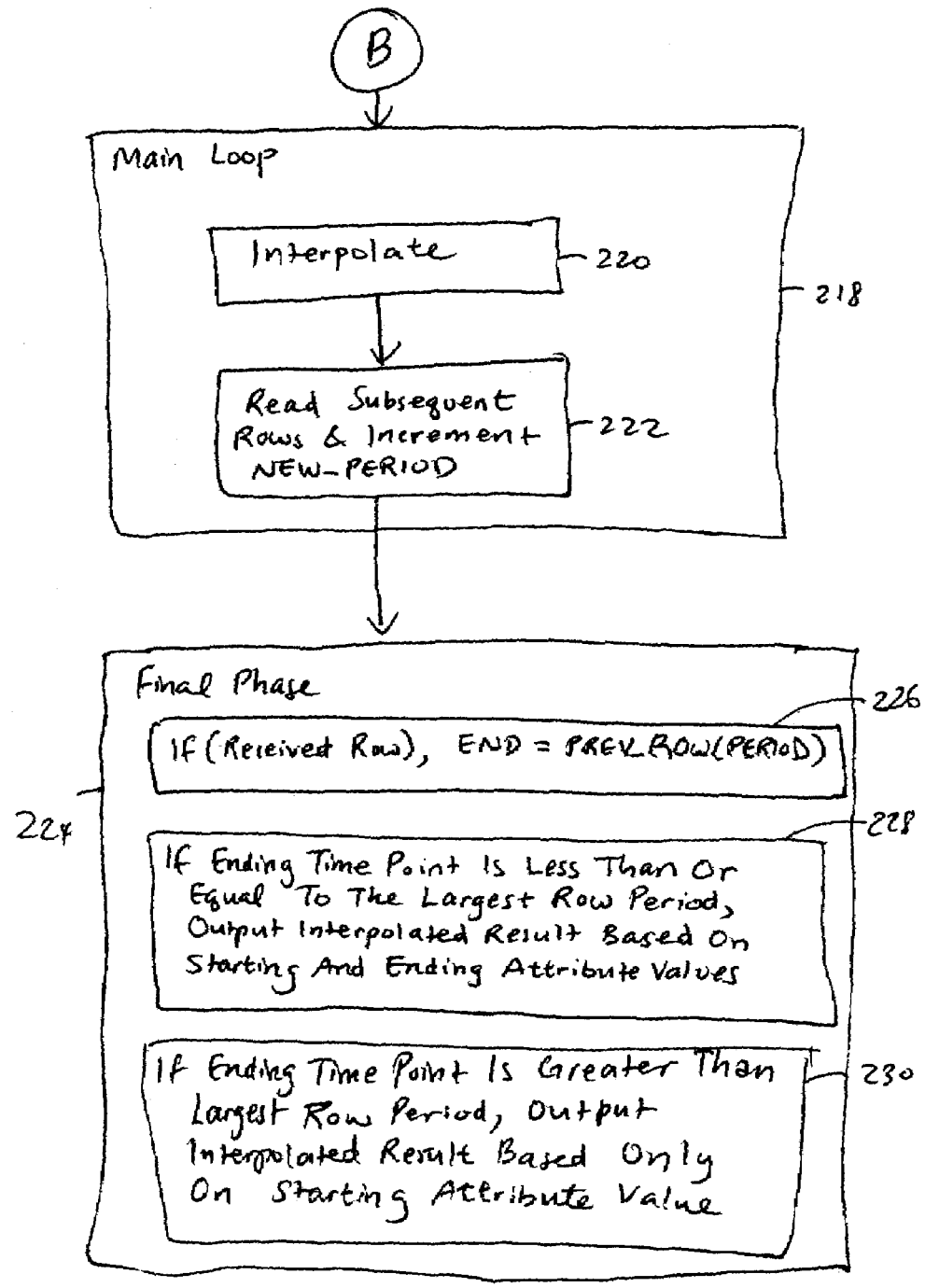

Next, the sorted result is scanned (at 126) to calculate interpolated values. The interpolation process of 126 is shown in FIGS. 3A-3B. The interpolation process is explained in the context of the pseudocode provided below. Note that the pseudocode illustrates one example implementation of performing the interpolation. In other embodiments, other implementations of the interpolation process are employed.

The first phase of the interpolation process is the initialization phase 202. Note that each access module 18 in a parallel database system performs the interpolation process independently and in parallel. To perform an interpolation, a starting attribute value and an ending attribute value of a given interval is specified. For example, to perform interpolation on the UNITS column of the INVENTORY table, a starting UNITS value and an ending UNITS value is used. Assume a given access module stores rows at time points 10 and 50. Values of UNITS between time points 10 and 50 are calculated by interpolation. For such an interpolation, the starting attribute value is the value of UNITS in the row stored at time point 10, and the ending attribute value is the value of UNITS in the row stored at time point 50.

In the initialization phase 202, the first row (ROW) of the access module is read (at 204). For each access module on which SentRow is set, a parameter START is set to the value of the PERIOD attribute of the first ROW (at 206), and the value of a parameter NEW_PERIOD is set equal to START (at 208). START specifies the starting time point, on a given access module, at which interpolation is to be performed.

If the starting time point (START) is determined (at 209) to be less than the smallest PERIOD value (i.e., the PERIOD value of the first row) of the access module, then that indicates that on the given access module, the first stored ROW has a PERIOD value greater than the specified starting time point of the interpolation. In this case, for each interpolation time point less than the PERIOD value of the first stored ROW, there is no stored row containing a starting attribute value—therefore, only an ending attribute value is available for interpolation for such interpolation points. The "interpolation points" refer to the time points at which interpolation is to be performed. For example, if an access module stores rows at time points 10 and 50, a specified starting time point (START_PERIOD in the PERIOD clause) is 5, and the specified periodicity (PERIODICITY) is 2, then the interpolation points are 5, 7, 9, 11, 13, etc. At interpolation points 5, 7, and 9, there is no row stored before each of those time points, so there is only an ending attribute value (in the row stored at time point 10). Therefore, the OUTPUT function outputs (at 210) an interpolation result at each of time points 5, 7, and 9 based only on the ending attribute value, ROW(VALUE), with the starting attribute value set to a NIL value. At 212, the NEW_PERIOD value is incremented (by calling the INCREMENT function) to obtain the next interpolation time point. Basically, NEW_PERIOD is incremented by the value of PERIODICITY.

Once the interpolation time point (NEW_PERIOD) has crossed past the PERIOD value of the first stored row (that is, NEW_PERIOD is no longer less than ROW(PERIOD)), the interpolation process proceeds to the main loop (218). The interpolation process also proceeds to the main loop (218) from the initialization loop (202) if the value of START is greater than or equal to the first row PERIOD value, after the access module sets PREV_ROW to ROW (at 214) and reads the next ROW (at 216).

In the main loop, interpolated results are obtained (at 220) while the specified ending time point (END) is greater than or equal to the value of ROW(PERIOD), and before the end of the file (END_OF_FILE) has been reached. END_OF_FILE refers to the end of the table portion stored on the given access module. The OUTPUT function returns an interpolated result, set according to the specified interpolation method (METHOD), based on the starting attribute value, PREV_ROW(VALUE), and the ending attribute value, ROW(VALUE). Subsequent rows are read (read next ROW) and interpolations are performed at subsequent interpolation points (INCREMENT(NEW_PERIOD)) (at 222) until an end-of-file condition is reached.

If the end of file is reached, then the access module proceeds to the final phase (224). In the final phase, there are two scenarios: (1) ReceivedRow is true; and (2) ReceivedRow is false. In the first case, the access module only needs to compute up to (but not including) the final row of the access module (since the final row of the storage module is a copy of the first row of the next access module). If ReceivedRow is true, then the value of END is set equal (at 226) to ROW(PERIOD), which is the last row of the access module.

If the ending time point (END) is less than or equal to the largest time period (the time period of the last row), then the interpolated result calculated (at 228) by the OUTPUT function is based on the starting attribute value, PREV_ROW(VALUE), and ending attribute value, ROW(VALUE). However, if the ending time point (END) is greater than the largest time period, then the interpolated result calculated (at 230) by the OUTPUT function is based only on a starting attribute value, PREV_ROW(VALUE), with the ending attribute value set to NIL. For example, if the stored rows are at time points 10 and 50, and the ending time point is 53, and there are two interpolation time points 51 and 53, then the interpolated results for interpolation time points 51 and 53 are based only on the starting attribute value (of the row at 50).

```
/*initialization*/
    read first ROW;
    if (SentRow)/* this access module only needs to start computing
            from the first row value */
    START = ROW(PERIOD);
    NEW_PERIOD = START;
    if (START < ROW(PERIOD)){
    /* starting period < the smallest row period */
        while (NEW_PERIOD < ROW(PERIOD)){
        OUTPUT(NEW_PERIOD, NIL, NIL,
            ROW(PERIOD), ROW(VALUE), METHOD, SentRow);
        NEW_PERIOD = INCREMENT(NEW_PERIOD);
        }
    }
    else {
    /* STARTING PERIOD >= to the smallest row period */
        while (START >= ROW(PERIOD)){
        PREV_ROW = ROW;
        read next ROW;
        }
    }
/* the main loop */
    while (END >= ROW(PERIOD) && not(END_OF_FILE)){
        while (NEW_PERIOD > ROW(PERIOD)){
        OUTPUT(NEW_PERIOD, PREV_ROW(PERIOD),
            PREV_ROW(VALUE), ROW(PERIOD), ROW(VALUE),
            METHOD, SentRow);
        NEW_PERIOD = INCREMENT(NEW_PERIOD);
        }
        PREV_ROW = ROW;
        read next ROW;
    }
/* finish phase */
    if (END_OF_FILE && ReceivedRow)/* this access module only
        needs to compute up to last row on this PU */
```

-continued

```
    END = PREV_ROW(PERIOD);
    if (END < ROW(PERIOD)){
    /* final period <= the largest row period */
        while (NEW_PERIOD <= END){
        OUTPUT(NEW_PERIOD, PREV_ROW(PERIOD),
            PREV_ROW(VALUE), ROW(PERIOD), ROW(VALUE),
            METHOD, SentRow);
        NEW_PERIOD = INCREMENT(NEW_PERIOD);
        }
    }
    else if (END_OF_FILE){
    /* final period > the largest row period */
        while (NEW_PERIOD <= END){
        OUTPUT(NEW_PERIOD, PREV_ROW(PERIOD),
            PREV_ROW(VALUE), NIL, NIL, METHOD, SentRow);
        NEW_PERIOD = INCREMENT(NEW_PERIOD);
        }
    }
}
```

Instructions of the various software routines or modules discussed herein (such as the parsing engine 16, access modules 18, and various functions) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system, comprising:
providing a computer executable interpolation function to perform interpolation of data;
passing a parameter to the computer executable interpolation function to indicate an interpolation technique to use, wherein passing the parameter to indicate the interpolation technique comprises indicating one of a linear interpolation technique, a start-level interpolation technique, and an end-level interpolation technique;
receiving at the database system a database query containing the computer executable interpolation function; and
executing within the database system the computer executable interpolation function in performing tasks specified by the database query, thereby generating interpolated results.

2. The method of claim 1, wherein receiving the database query containing the computer executable interpolation function comprises receiving the database query containing the computer executable interpolation function in a select list of the database query.

3. The method of claim 2, wherein receiving the database query comprises receiving a SELECT statement.

4. The method of claim 1, further comprising passing another parameter to the computer executable interpolation function to indicate a column of a table on which interpolation is to be performed.

5. The method of claim 1, wherein receiving the database query further comprises receiving a database query with a clause specifying a time duration over which interpolation is to be performed by the computer executable interpolation function.

6. The method of claim 5, wherein providing the computer executable interpolation function further comprises providing an interpolation function to perform temporal interpolation, and wherein the clause further specifies a periodicity within the time duration for performing the temporal interpolation.

7. An article comprising at least one electronic storage medium containing computer executable instructions that when executed cause a database system to:
receive a query that specifies performance of interpolation of data; and
generate from the query one or more commands relating to the performance of the interpolation of the data;
send the one or more commands to plural processing units in the database system to perform interpolation of data in parallel,
wherein the computer executable instructions when executed cause the database system to cause (i) each processing unit to sample data rows in a respective storage module and send sampled data rows to a control processing unit, and (ii) the control processing unit to determine a number of groups of the sampled data rows as defined by one or more grouping attributes specified in the database query.

8. The article of claim 7, wherein receiving the query comprises receiving a query containing an interpolation function.

9. The article of claim 7, wherein the computer executable instructions when executed cause the database system to redistribute data across the processing units to balance the workload of the processing units in performing the interpolation.

10. The article of claim 7, wherein receiving the query comprises receiving a SELECT statement.

11. The article of claim 10, wherein receiving the SELECT statement comprises receiving an interpolation function in a select list of the SELECT statement.

12. A parallel database system comprising:
a plurality of storage modules,
a plurality of processing units to manage parallel access of data in respective storage modules;
a parsing controller to receive a query that specifies performance of interpolation of the data,
wherein the parsing controller generates from the query one or more commands relating to the performance of the interpolation of the data and sends the one or more commands to the processing units,
wherein the processing units are operable to (i) redistribute data across the plurality of storage modules to balance the workload of the processing units in performing the interpolation, (ii) sample data rows in each of their respective storage modules, (iii) send sampled data rows to a control processing unit, and (iv) interpolate the data according to the one or more commands, and
wherein the control processing unit is operable to determine a number of groups of the sampled data rows as defined by one or more grouping columns specified in the database query.

13. The parallel database system of claim 12, the processing units to perform the interpolation of data in parallel.

14. The parallel database system of claim 12, wherein the processing units redistribute data according to one of a hash code distribution technique and a range distribution technique.

15. The parallel database system of claim 12, the control processing unit to select one of plural redistribution techniques based on a comparison of the number of groups and a number of processing units.

16. The parallel database system of claim 12, wherein the parsing controller comprises a parser.

17. The parallel database system of claim 12, wherein the query contains an interpolation function.

18. The parallel database system of claim 17, wherein the query comprises a SELECT statement.

19. The parallel database system of claim 18, wherein the SELECT statement contains a select list, the interpolation function being in the select list.

* * * * *